United States Patent
Rao et al.

(10) Patent No.: US 8,089,534 B2
(45) Date of Patent: Jan. 3, 2012

(54) MULTI ILLUMINANT SHADING CORRECTION USING SINGULAR VALUE DECOMPOSITION

(75) Inventors: Pravin Rao, San Jose, CA (US); Shane Hu, Fremont, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 665 days.

(21) Appl. No.: 12/264,588

(22) Filed: Nov. 4, 2008

(65) Prior Publication Data

US 2010/0110241 A1 May 6, 2010

(51) Int. Cl.
*H04N 5/217* (2011.01)
(52) U.S. Cl. ........................................ 348/241
(58) Field of Classification Search .......... 348/241, 348/251, 625, 649, 335, 382
See application file for complete search history.

(56) References Cited

U.S. PATENT DOCUMENTS

| | | | |
|---|---|---|---|
| 6,738,057 B1 | 5/2004 | Campbell | |
| 7,471,319 B2 * | 12/2008 | Miller | 348/241 |
| 2007/0097235 A1 | 5/2007 | Miller | |
| 2007/0146506 A1 | 6/2007 | Lin et al. | |

FOREIGN PATENT DOCUMENTS

| | | |
|---|---|---|
| JP | 2001045288 A2 | 2/2001 |
| JP | 2005167686 A2 | 6/2005 |
| JP | 2005278004 A2 | 10/2005 |
| JP | 2007150934 A2 | 6/2007 |

* cited by examiner

*Primary Examiner* — Hung Dang
(74) *Attorney, Agent, or Firm* — RatnerPrestia (57) ABSTRACT

Methods and systems for determining shading correction coefficients of an imaging device. An inversion surface is determined based on an image captured by the imaging device. The inversion surface is approximated using the captured image and eigenvectors associated with singular values of the inversion surface, to form multiple reconstruction weights. A polynomial fit is applied to: i) the multiple reconstruction weights to determine a first set of polynomial coefficients and ii) the eigenvectors to determine a second set of polynomial coefficients. The first and second sets of polynomial coefficients are used to form the shading correction coefficients.

21 Claims, 7 Drawing Sheets

MULTI ILLUMINANT SHADING CORRECTION USING SINGULAR VALUE DECOMPOSITION

FIELD OF THE INVENTION

The present invention relates to CMOS imagers and, more particularly, to methods and apparatus for determining shading correction coefficients of an imaging device.

BACKGROUND OF THE INVENTION

Image sensors find applications in a wide variety of fields, including machine vision, robotics, guidance and navigation, automotive applications and consumer products. In many smart image sensors, it is desirable to integrate on-chip circuitry to control the image sensor and to perform signal and image processing on the output image. Charge-coupled devices (CCDs), which have been one of the dominant technologies used for image sensors, however, do not easily lend themselves to large scale signal processing and are not easily integrated with complimentary metal oxide semiconductor (CMOS) circuits.

CMOS image sensors receive light into an imaging array including a photosensitive pixel array. One of the difficulties in designing imaging systems is in the optimization of individual pixels within the pixel array. For example, the imaging system may be affected by lens shading effects due to a combination of imaging lens and image sensor parameters. Examples of lens shading include lens vignetting (typically modeled by a cosine power fourth equation), pixel vignetting (for example due to a variability of chief ray angles (CRA) with respect to the image sensor), light diffraction at the pixel level and crosstalk between pixels. When combined together, these different lens shading phenomena may produce a low frequency change in an amplitude of an imaged flat field, for example, from a center to a corner of the imaging lens. Accordingly, it is desirable to correct a captured image for lens shading effects.

Obtaining an optimized imaging array is becoming increasingly important as technology tends towards producing a reduced pixel size along with an increased image quality. Accordingly, there is an interest in determining optimized shading correction parameters.

BRIEF DESCRIPTION OF THE DRAWINGS

The invention may be understood from the following detailed description when read in connection with the accompanying drawing. Included in the drawing are the following figures.

DETAILED DESCRIPTION OF THE INVENTION

Figure 1:
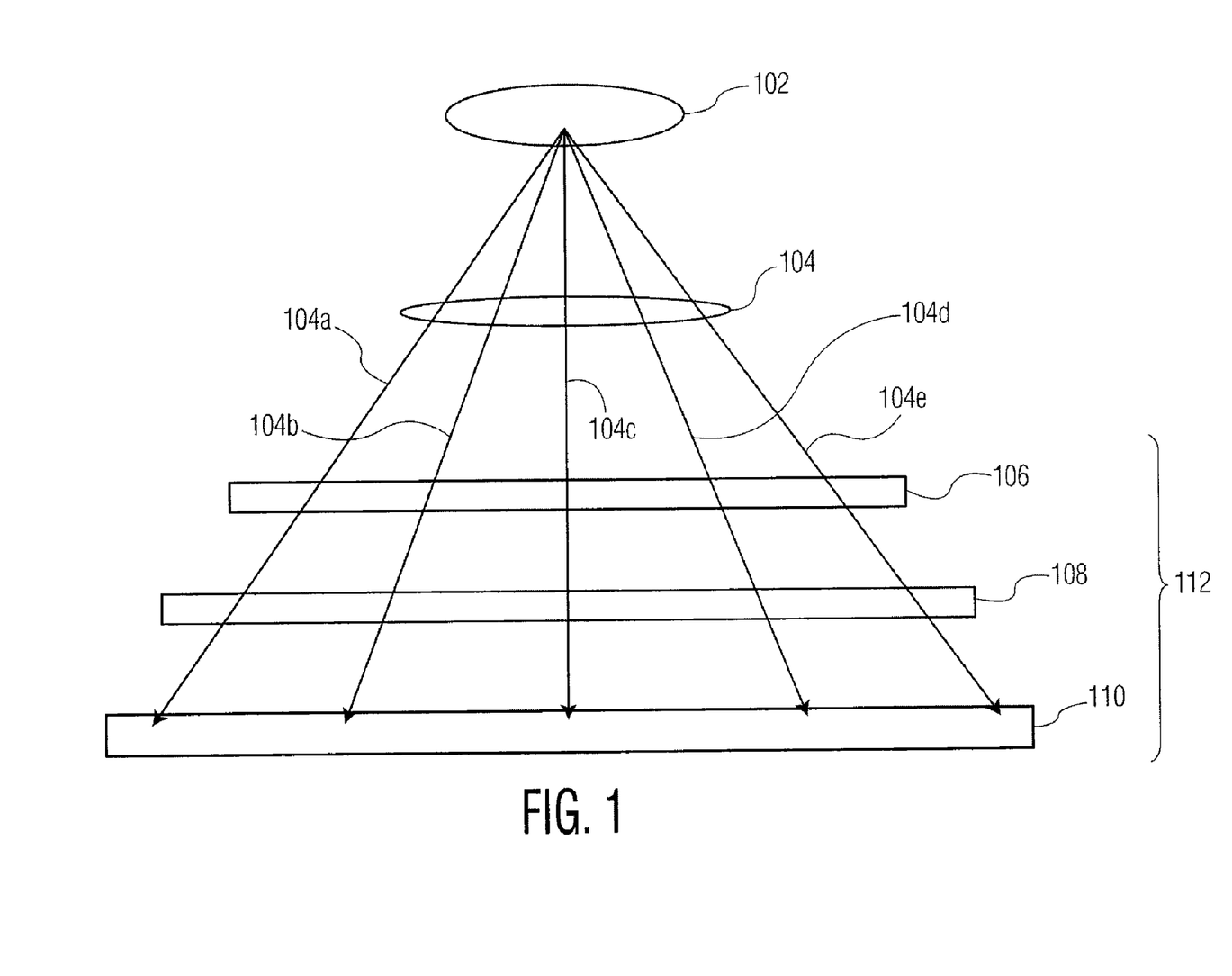
FIG. 1 is a block diagram illustrating a relationship between an imaging lens and an imaging array for incoming light at various angles.

FIG. 1 is a cross section diagram of imaging lens 102 and imaging array 112 with respect to incoming light 104. As shown in FIG. 1, imaging array 112 includes microlens array 106, color filter array 108 and pixel array 110. Incoming light 104 is produced from imaging lens 102 such that individual rays of light 104$a$, 104$b$, 104$c$, 104$d$ and 104$e$ strike pixel array 110 at different angles. Color filter array 108 can block incoming light of a particular color(s) from reaching the photosensitive portion of the corresponding pixels. Color filter array 108 may be monochromatic or may include color filters for passing light of N different colors to corresponding pixels of pixel array 110. According to one embodiment, N=4 (e.g., color filter array 108 includes red, blue, light green and dark green color filters). According to another embodiment, N=3 (e.g., color filter array 108 includes red, blue and green color filters).

If the incoming light 104 is provided perpendicular to imaging array 112, the photosensitive portions of pixel array 110, microlens array 106 and color filter array 108 may be arranged to have their centers substantially aligned. In practice, microlens array 106 and color filter array 108 are typically shifted with respect to each other, to focus incoming light 104 onto respective underlying, photosensitive regions of pixel array 110. Any remaining signal degradation, such as signal degradation due to differences in illumination of the imaging lens, may be compensated by using lens shading correction algorithms, determined as described below with respect to FIGS. 2-4.

Figure 2:
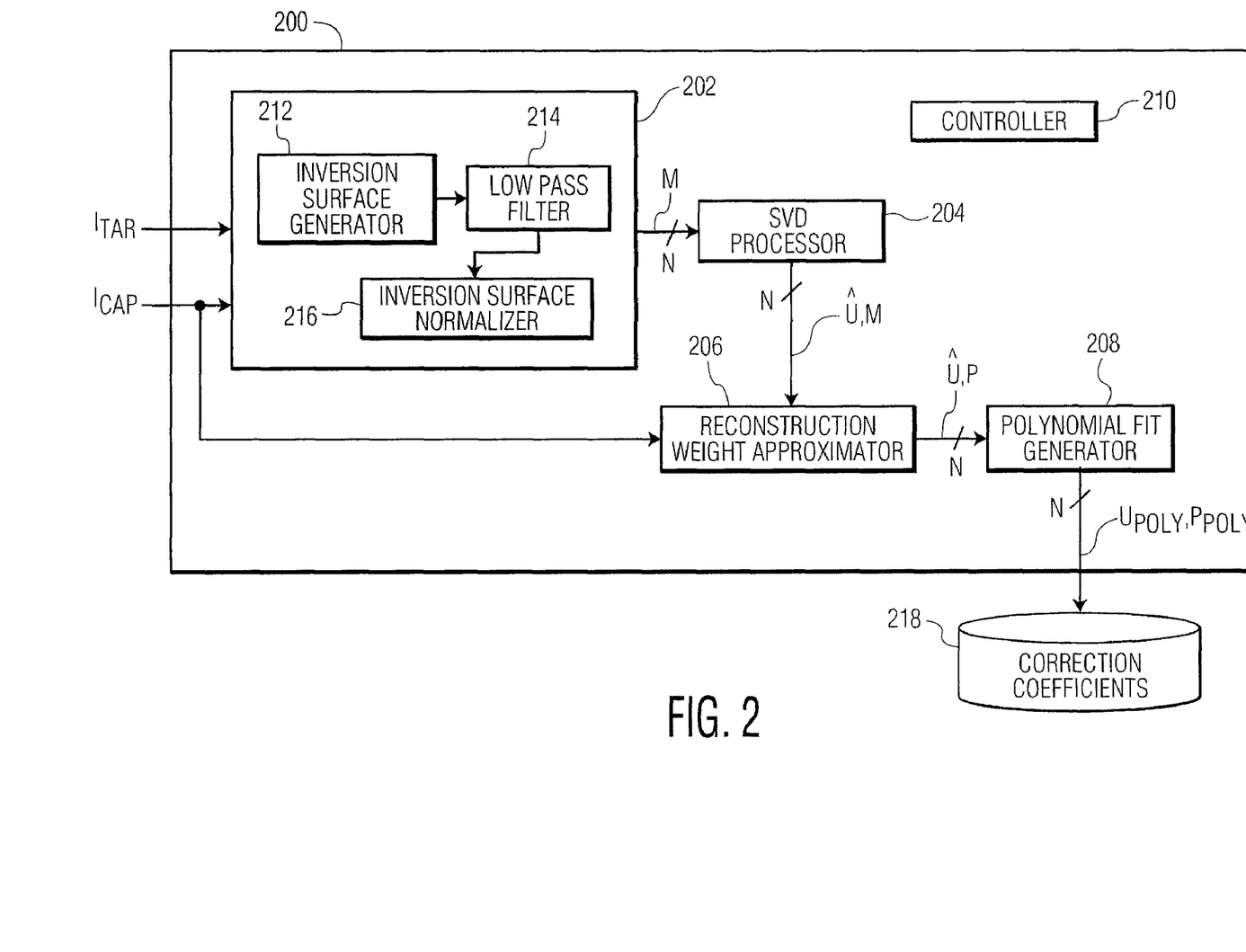
FIG. 2 is a block diagram illustrating a lens shading correction system according to an embodiment of the invention.

FIG. 2 is a block diagram of a lens shading correction (LSC) system, designated generally as 200. LSC system 200 includes pre-processing system 202, singular value decomposition (SVD) processor 204, reconstruction weight approximator 206, polynomial fit generator 208 and controller 210. LSC 200 operates according to software that generates lens shading correction coefficients. In general, LSC system 200 receives target image ($I_{TAR}$) from a reference image source and captured image ($I_{CAP}$), for example, from pixel array 110 (FIG. 1) and generates shading correction coefficients (i.e., $U_{poly}$, $P_{poly}$), described further below with respect to FIG. 3. The lens shading correction coefficients may be stored in storage 218.

Controller 210 controls pre-processing system 202, SVD processor 204, reconstruction weight approximator 206 and polynomial fit generator 208 for generating the shading correction coefficients. Controller 202 may also receive information, for example, from a user interface (not shown), and adjust one or more settings of pre-processing system 202, SVD processor 204, reconstruction weight approximator 206 and polynomial fit generator 208. In addition, controller 210 may perform at least some of the functions of one or more of pre-processing system 202, SVD processor 204, reconstruction weight approximator 206 and polynomial fit generator 208.

Pre-processing system 202 includes inversion surface generator 212, low pass filter 214 and inversion surface normalizer 216. Pre-processing system 202 receives $I_{TAR}$ and $I_{CAP}$, and generates an inversion surface ($M_i$) for each color i of color filter array 108 (FIG. 1), where i represents a positive integer and i ranges from 1 to N. It is understood that a number of inversion surfaces $M_i$ depends on the number of different colors (i.e. N) of color filter array 108 (FIG. 1).

Inversion surface generator 212 generates an initial inversion surface ($A^{-1}$) using a ratio of the received $I_{TAR}$ and $I_{CAP}$ images. $I_{TAR}$ represents a flat field with known characteristics. For example, $I_{TAR}$ may be a uniformly gray field. $I_{CAP}$ represents the image captured by the pixel array 110 (FIG. 1) (i.e. the flat field attenuated by any lens shading effects). It is understood that the captured image may be exposed to a known central response. For example, the exposure time for the captured image may be adjusted such that a value of a pixel near the center of pixel array 110 is saturated by known amount, for example, with about 50% saturation. As $I_{TAR}$ is a flat field image, it may be represented by a single pixel value which may include three or four sub-pixel values, i.e., one for each of the component colors of the pixel array 110 (FIG. 1).

A general relationship between $I_{TAR}$ and $I_{CAP}$ may be expressed by equation (1) as:

$$I_{CAP} = A \cdot I_{TAR} \quad (1)$$

where A represents an attenuation function that corresponds to lens shading effects caused by imaging lens 102 (FIG. 1), imaging array 112 or a combination thereof. The initial inverse surface $A^{-1}$ may be represented by equation (2) as:

$$A^{-1} = I_{TAR}/I_{CAP}. \quad (2)$$

For example, if $I_{TAR}$ is a uniform gray field, the captured image has about 50% saturation, and the imaging array 112 (FIG. 1) represents a 10 bit sensor, a value for 50% saturation is about 512. The initial inverse surface $A^{-1}$ may thus be determined from the ratio of $512/I_{CAP}$.

In addition, inversion surface generator 212 determines individual color component surfaces for each color i, using the initial inversion surface $A^{-1}$. In particular, inversion surface generator 212 may separate initial inversion surface $A^{-1}$ into N different color component surfaces. Each color component surface may include a subset of the initial inversion surface $A^{-1}$ corresponding to indices of imaging array 112 (FIG. 1) associated with a particular color i.

Low pass filter 214 receives each color component surface from inversion surface generator 212. Low pass filter 214 may filter each color component surface by a respective low pass filter to reduce any contributions of noise in the captured image $I_{CAP}$. According to one embodiment, low pass filter 214 includes a two-pass 5×5 pixel median filter. According to another embodiment, low pass filter 214 includes a quadruple-pass 30 pixel filter with two-dimensional Gaussian shaped distribution surface (with a variance of 0.15). It is understood that low pass filter 214 may use any suitable software components to generate desired filter characteristics. Although low pass filter 214 is described as being applied to the individual color component surfaces, according to another embodiment, low pass filter 214 may be applied to the captured image $I_{CAP}$, for example, if color filter array 108 (FIG. 1) is monochromatic.

Inversion surface normalizer 216 receives each filtered component surface (i.e., for each color i) from low pass filter 214 and normalizes each filtered component surface by its respective peak response. The normalized component surface, for each color i, forms respective inverse surface $M_i$. In FIG. 1, M represents the set of individual inverse surfaces $M_i$.

SVD processor 204 receives inversion surfaces M (i.e., an inversion surface $M_i$ for each color) and performs a singular value decomposition (SVD) on each of the inversion surfaces. Singular value decomposition is known to the skilled person and, in general, diagonalizes a matrix by determining singular values and singular vectors of the matrix. The singular values, when arranged in descending order, may predict a contribution of successive singular values and their corresponding vectors to the matrix.

The SVD of inversion surface M is shown by equation (3) as:

$$M = U\Sigma V^T \quad (3)$$

where $U^T U = V^T V = I$, I represents an identity matrix, U represents left eigenvectors, $\Sigma$ represents singular values of inversion surface M, V represents right eigenvectors and $(\cdot)^T$ represents a transpose operation. The matrix $\Sigma$ is diagonal with non-negative elements arranged in decreasing order. Eq. (3) and equations of the remainder of the discussion represent parallel processing for each individual inversion surface $M_i$. According to an aspect of the invention, the left eigenvectors U (also referred to herein as eigenvectors, in general) may be used to predict inversion surfaces M and, more particularly, to predict an underlying variance in inversion surfaces M.

Figure 6:
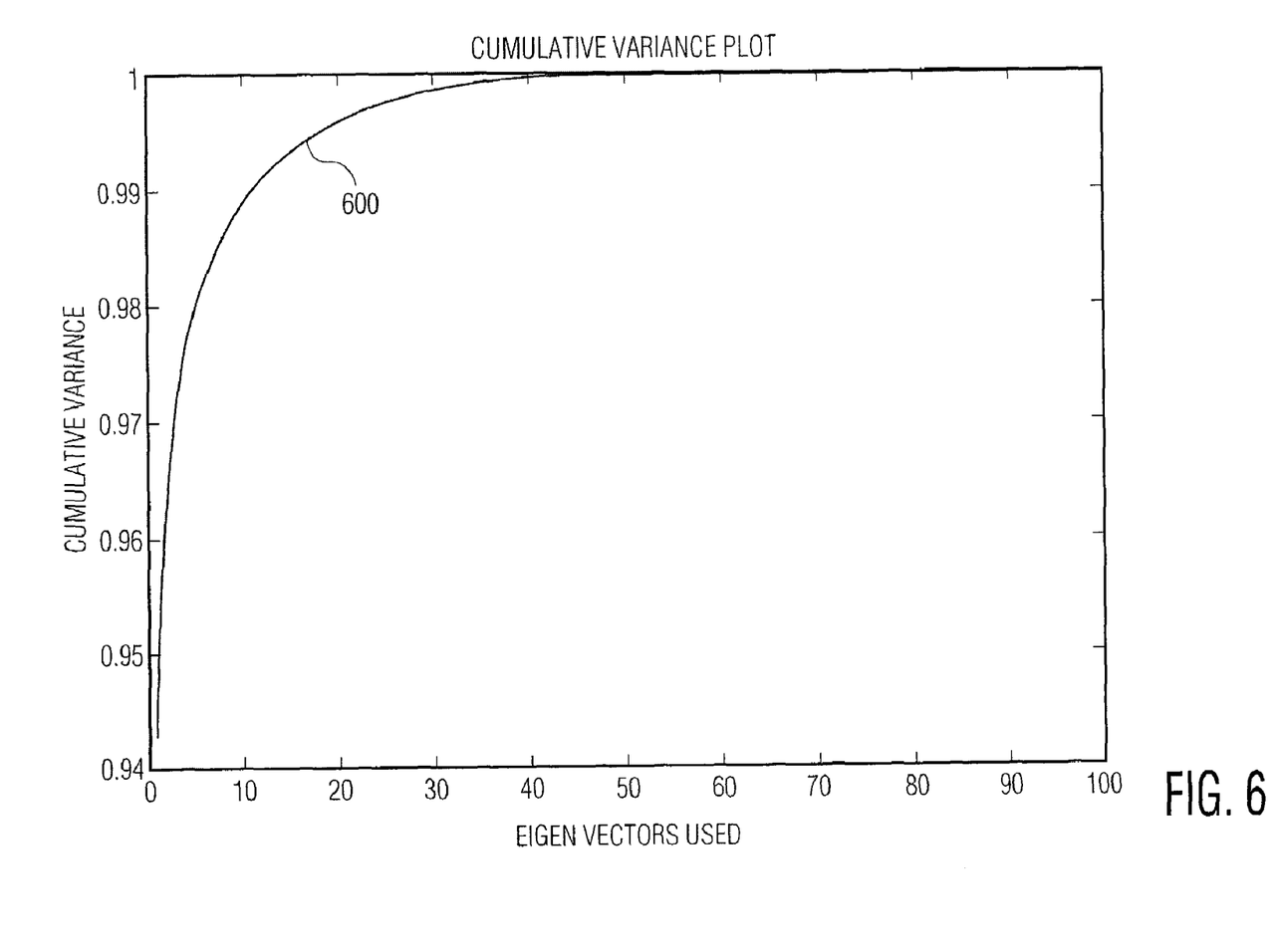
FIG. 6 is a graph of variance of singular values of an inversion surface as a function of a number of eigenvectors according to an embodiment of the invention.

SVD processor 204 may also truncate the number of left eigenvectors U (i.e. reduce the eigenvectors in number) that are used to generate the correction coefficients. The truncated eigenvectors $\hat{U}$ are related to the eigenvectors, shown in equation (4) as:

$$\hat{U} = U(1 \text{ to } k) \quad (4)$$

where k is a positive integer. The truncated number of eigenvectors may be selected such that a variance in the inversion surface may be predicted to a desired accuracy, further described below with respect to FIG. 6.

Reconstruction weight approximator 206 receives truncated eigenvectors $\hat{U}$, inversion surface M and captured image $I_{CAP}$. Reconstruction weight approximator 206 forms reconstruction weights P by approximating the inversion surface, based on the truncated eigenvectors $\hat{U}$ and the captured image $I_{CAP}$. Reconstruction weights P may be determined by approximating the inversion surface, for example, by using regression analysis.

Initial reconstruction weights $P_1$ may be determined by equation (5) as:

$$P_1 = (\hat{U}/M)^T. \quad (5)$$

Accordingly, an initial approximated inversion surface $\tilde{M}_1$ may be determined using $\hat{U}$ and $P_1$ as shown in equation (6):

$$\hat{U} P_1 = \tilde{M}_1. \quad (6)$$

Final reconstruction weights P may be determined by approximating the inversion surface by regression analysis, using truncated eigenvectors $\hat{U}$ and the initial inversion surface, until a best fit of the approximated inversion surface to a set of observations is determined. As known to the skilled person, regression analysis typically determines values of parameters that minimize a sum of squared residual values for the set of observations, such as with linear regression by a least squares fit. It is understood that the invention is not limited to linear regression analysis or to least squares fitting to approximate the reconstruction weights. Examples of other methods for approximating the inversion surface may include Bayesian linear regression techniques or nonlinear regression techniques.

Polynomial fit generator 208 receives reconstruction weights P and truncated eigenvectors $\hat{U}$ from reconstruction weight approximator 206 and determines polynomial-fitted correction coefficients ($U_{POLY}$, $P_{POLY}$). Polynomial coefficients $U_{POLY}$, $P_{POLY}$ are also referred to herein as a first and second sets of polynomial coefficients, respectively. As described above, multiplication of truncated eigenvectors $\hat{U}$ with reconstruction weights P produces the approximated inversion surface. The approximated inversion surface, in turn, may be used to correct for shading effects (i.e., the shading correction coefficients may be formed by the multiplication of $\hat{U}$ with P). The length of the truncated eigenvectors $\hat{U}$, however, is equal to the number of rows of imaging array 112 (FIG. 1) and the length of the scalars P equals the number of columns of imaging array 112.

In order to reduce the number of reconstruction coefficients, P and $\hat{U}$ may each be fitted with a polynomial of a suitable degree. As known to the skilled person, polynomial fitting may be used to find coefficients of a polynomial of a selected degree that fits a data set, in a least squares sense and with a suitable curve fitting error. According to one embodiment, polynomials of second or third order are used for polynomial fitting $\hat{U}$ and P. It is understood that any suitable degree of the polynomial may be chosen to determine the respective first and second sets of polynomial coefficients with a suitable fitting error. It is also under stood that a suitable degree of the polynomial may be selected based on a total number of coefficients (i.e. first and second sets of polynomial coefficients for each color i) that may be stored and/or processed. Accordingly, a suitable polynomial degree may be selected to reduce the number of stored shading correction coefficients and/or reduce a cost of processing the correction coefficients.

Storage 218 may be used to store $U_{POLY}$, $P_{POLY}$, which are used to provide lens shading correction coefficients (i.e. the multiplication of respective polynomial functions with $U_{POLY}$ with $P_{POLY}$). Storage 218 may be an internal memory or an external memory on a remote device.

In one embodiment, LSC system 200 may be used in a calibration process to provide shading correction coefficients used throughout a life cycle of a CMOS imaging device. In another embodiment, the shading correction coefficients may be updated during the life cycle of the CMOS imaging device. For example, optical characteristics of imaging lens 102 may change over time and/or lighting conditions may vary, which may produce nonoptimal shading correction, if the lens shading correction coefficients are not updated.

Figure 3:
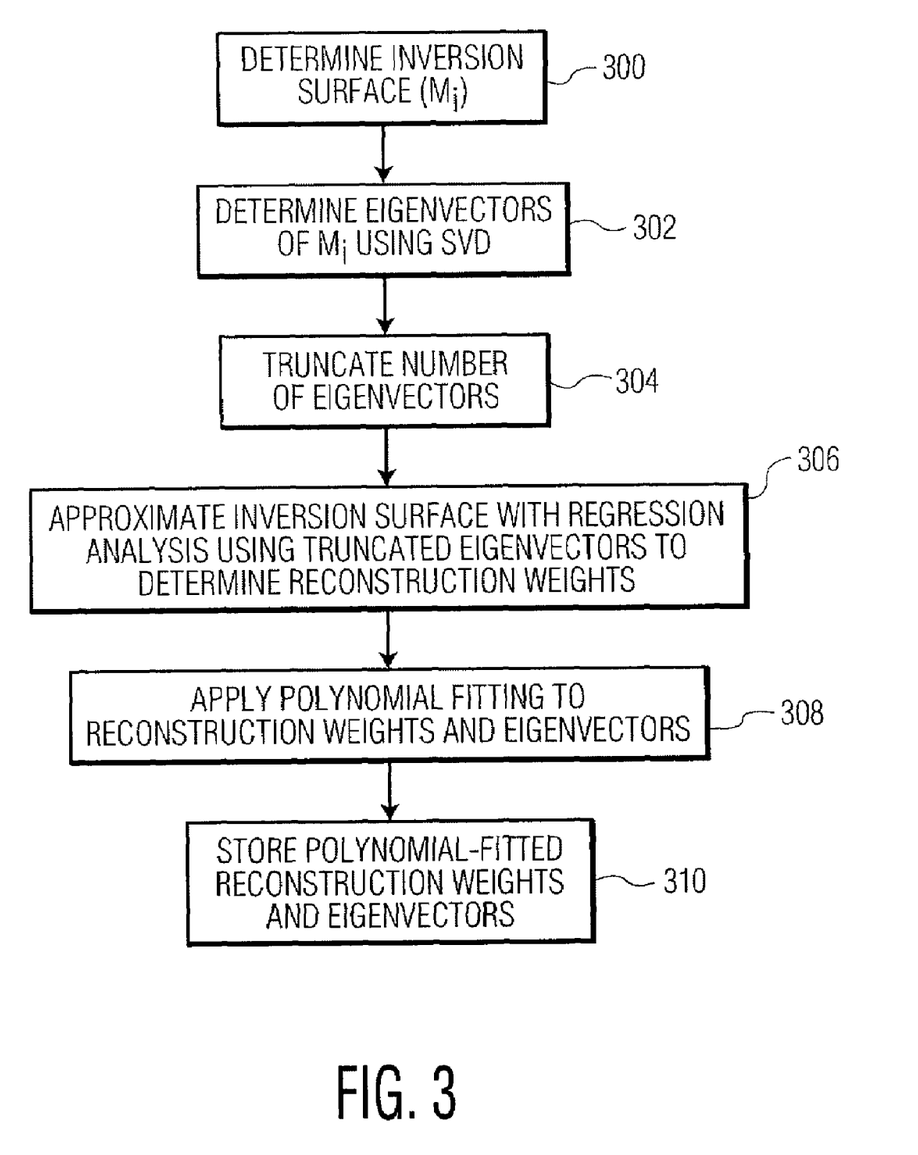
FIG. 3 is a flow chart illustrating a method for determining shading correction coefficients according to an embodiment of the invention.

Referring to FIG. 3, a flow chart for determining shading correction coefficients (for each individual color i) is shown. At step 300, an inversion surface $M_i$, for each color component is determined, for example, by pre-processing system 202 (FIG. 2). At step 302, eigenvectors U of each $M_i$ are determined using singular value decomposition, for example, by SVD processor 204 (FIG. 2).

At step 304, the number of eigenvectors is truncated, to form $\hat{U}$, for example, by SVD processor 204 (FIG. 2). In an example, a suitable number of eigenvectors $\hat{U}$ may be determined by analysis of a cumulative variance of the singular values $\Sigma$ (eq. (3)) as a function of the number of eigenvectors. Referring to FIG. 6, a graph is shown that illustrates an example of cumulative variance 600 of singular values of an inversion surface $M_i$ as a function of a number of eigenvectors. It may be appreciated that, even when about two to four eigenvectors are used, cumulative variance 600 is between about 0.96 to 0.98, indicating that the number of eigenvectors may be truncated without significantly reducing the accuracy of the predicted variance in the inversion surface.

Referring back to FIG. 3, at step 306, the inversion surface is approximated based on regression analysis, to provide reconstruction weights P, by using the truncated eigenvectors $\hat{U}$ and captured image $I_{CAP}$. For example, the reconstruction weights may be approximated by reconstruction weight approximator 206 (FIG. 2). At step 308, polynomial fitting is applied to truncated eigenvectors $\hat{U}$ and reconstruction weights P to respectively form $U_{POLY}$ and $P_{POLY}$. For example, polynomial fitting may be applied by polynomial fit generator 208 (FIG. 2).

At step 310, $U_{POLY}$ and $P_{POLY}$ may be stored, for example, in storage 218 (FIG. 2) for use as shading correction coefficients. Accordingly, an imaging device such as imaging device 500 (FIG. 5) may perform shading correction with the first and second sets of polynomial coefficients $U_{POLY}$ and $P_{POLY}$. Although not shown in FIG. 3, it is understood that a separate sets of $U_{POLY}$, $P_{POLY}$ may be determined for each color i. Accordingly, steps 300-310 may be repeated for each color i.

Figure 7A:
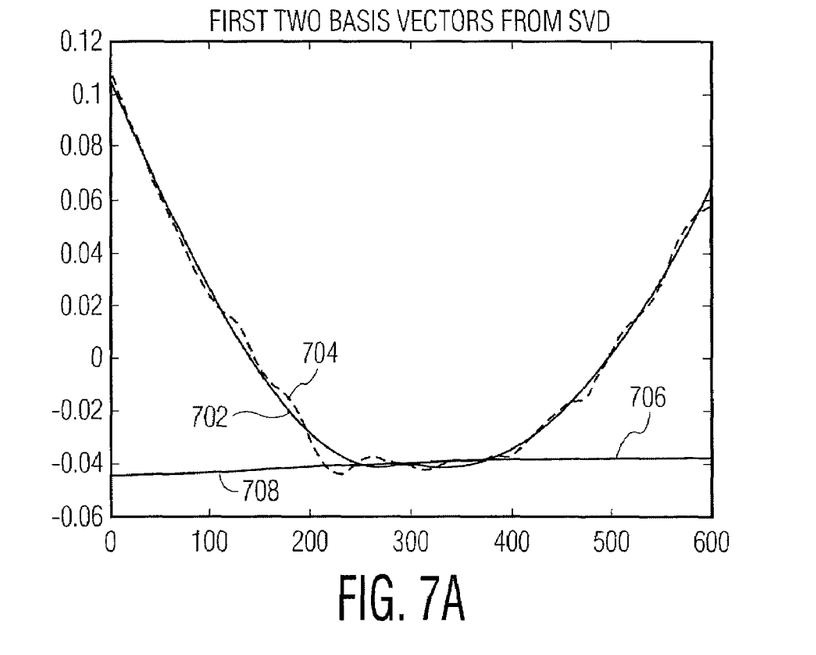
FIGS. 7A and 7B are graphs illustrating an example of cubic-fitted eigenvectors and the projection of the fitted eigenvectors onto an inversion surface according to an embodiment of the invention.
Figure 7B:
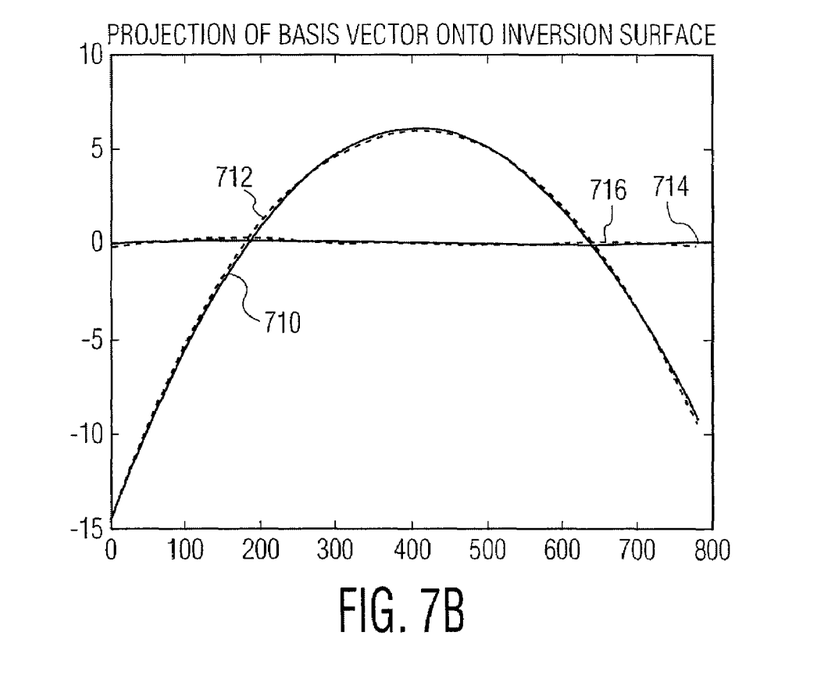
Figure 8A:
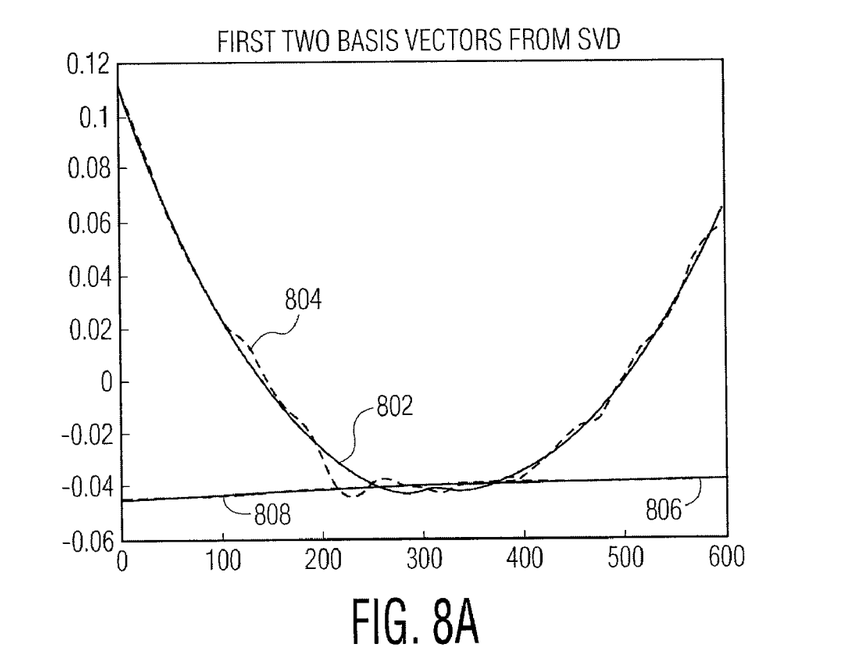
FIGS. 8A and 8B are graphs illustrating an example of quadratic-fitted eigenvectors and the projection of the fitted eigenvectors onto an inversion surface according to an embodiment of the invention.
Figure 8B:
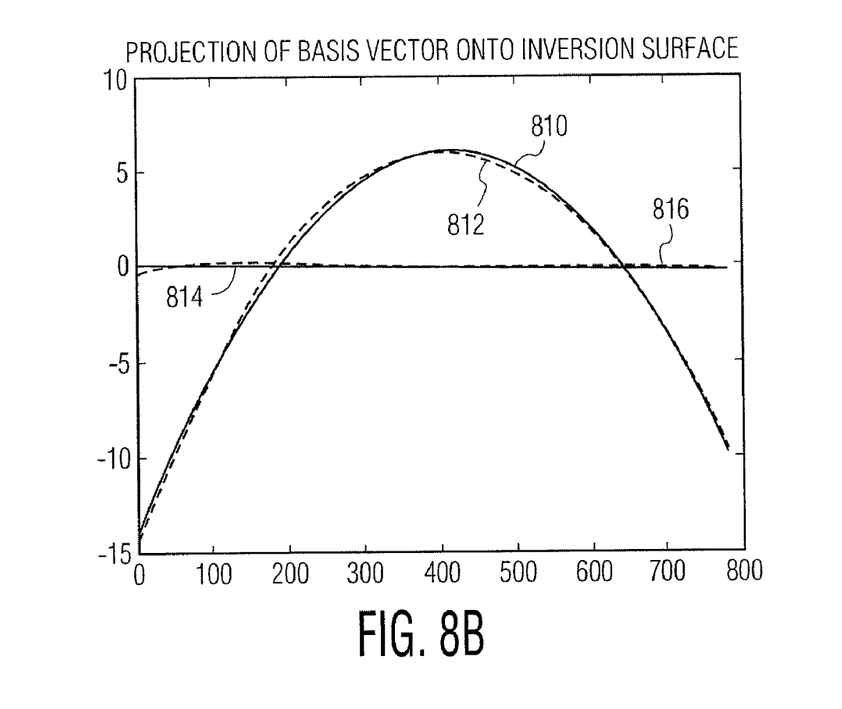

Referring next to FIGS. 7 and 8, examples of polynomial-fitted eigenvectors and the projection of the fitted eigenvectors onto an inversion surface is shown. In particular, FIG. 7A is a graph of cubic-fitted eigenvectors; FIG. 7B is a graph of the projection of the cubic-fitted eigenvectors onto an inversion surface; FIG. 8A is a graph of quadratic-fitted eigenvectors; and FIG. 8B is a graph of the projection of the quadratic-fitted eigenvectors onto an inversion surface. In both FIGS. 7 and 8 the first two eigenvectors are shown.

In FIG. 7A the first two fitted basis vectors 702, 706 and the corresponding actual basis vectors 704, 708 are shown. The cubic-fitted basis vectors 702, 706 substantially correspond to respective actual basis vectors 704, 708. In FIG. 7B, the projections 710, 714 of fitted basis vectors 702, 706 and the corresponding projections 712, 716 of actual basis vectors 704, 708 are shown. Fitted-projections 710, 714 substantially correspond to actual-projections 712, 716.

According to one embodiment having four color channels (e.g., red, blue, light green and dark green) and two basis vectors, a total of 96 coefficients were used for a cubic fit. For example, each basis vector 702, 706 may be divided and fitted with two separate third order polynomials. Each projection scalar 710, 714 may be fitted with one third order polynomial. Each color channel generally uses its own inversion surface. Accordingly, for each inversion surface there are: a)_(4 coefficients for a third order polynomial)×(2 separate polynomials per basis vector)×(2 basis vectors) and b) (4 coefficients for a third order polynomial)×(2 projections) or the equivalent of 24 coefficients per channel. A total of four color channels, thus, corresponds to 96 coefficients for a cubic fit.

According to another embodiment, each of the basis vectors 702, 706 and each of the projection scalars 710, 714 may be fitted with a single fourth order polynomial. For each inversion surface there are: a)_(5 coefficients for a fourth order polynomial)×(2 basis vectors) and b) (5 coefficients for a fourth order polynomial)×(2 projections) or the equivalent of 20 coefficients per channel. A total of four color channels, thus, corresponds to 80 coefficients for a fourth order fit.

In FIG. 8A the first two fitted basis vectors 802, 806 and the corresponding actual basis vectors 804, 808 are shown. The quadratic-fitted basis vectors 802, 806 substantially correspond to respective actual basis vectors 804, 808. In FIG. 8B, the projections 810, 814 of fitted basis vectors 802, 806 and the corresponding projections 812, 816 of actual basis vectors 804, 808 are shown. Fitted-projections 810, 814 substantially correspond to actual-projections 812, 816.

According to one embodiment having four color channels (e.g., red, blue, light green and dark green) and two basis vectors, a total of 72 coefficients were used for a quadratic fit. For example, each basis vector 802, 806 may be divided and fitted with two separate second order polynomials. Each projection scalar 810, 814 may be fitted with one second order polynomial. For each inversion surface there are: a)_(3 coefficients for a second order polynomial)×(2 separate polynomials per basis vector)×(2 basis vectors) and b) (3 coefficients for a second order polynomial)×(2 projections) or the equivalent of 18 coefficients per channel. A total of four color channels, thus, corresponds to 72 coefficients for a quadratic fit.

Referring back to FIG. 3, according to another embodiment, the target image may include one or more target images ($I_{TAR, j}$), where each target image $I_{TAR, j}$ may represent a flat field for a different illuminant j. Accordingly, steps 300-310 may be repeated for each different illuminant j, and a set of shading correction coefficients may also be determined for each different illuminant j.

Figure 4:
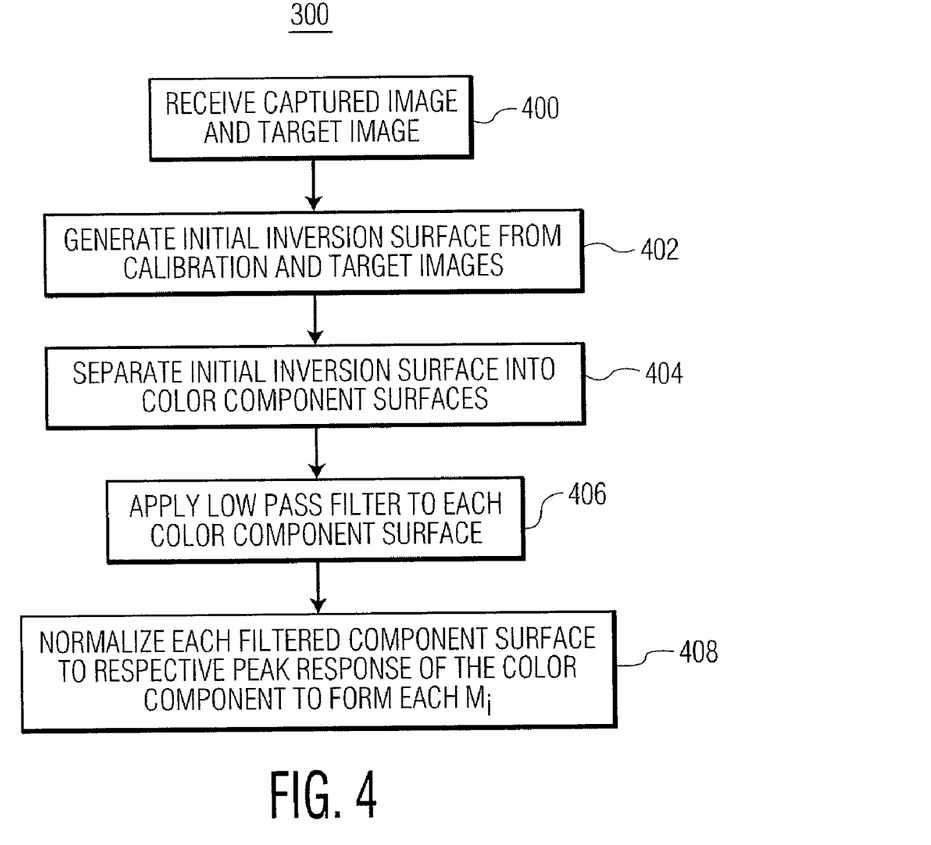
FIG. 4 is a flow chart illustrating a method for determining an inversion surface of an imaging device according to an embodiment of the invention.

Referring to FIG. 4, a flow chart for determining individual inversion surfaces $M_i$ for each color component, step 300 (FIG. 3) is shown. At step 400, the captured image ($I_{CAP}$) and the target image ($I_{TAR}$) are received, for example, by pre-processing system 202 (FIG. 2). At step 402, an initial inversion surface is generated from $I_{CAP}$ and $I_{TAR}$, for example, by inversion surface generator 212 (FIG. 2). At step 404, the initial inversion surface is separated into individual color component surfaces, for example, by inversion surface generator 212 (FIG. 2).

At step 406, a low pass filter is applied to each color component surface, for example, by low pass filter 214 (FIG. 2). At step 408, each filtered component surface is normalized to a respective peak response of the color component, for example, by inversion surface normalizer 216. The normalized component surface (for a individual color component) determined at step 408 forms the respective inversion surface $M_i$.

Figure 5:
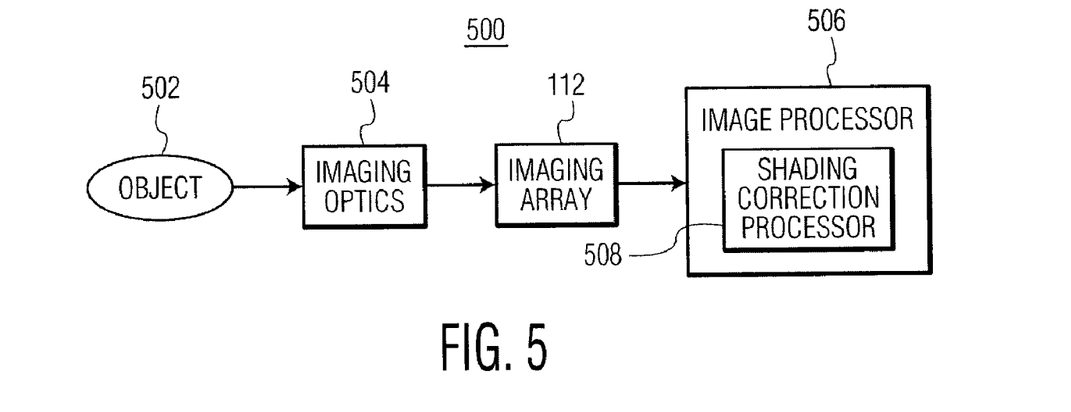
FIG. 5 is a block diagram of an imaging device including a shading correction processor according to an embodiment of the invention.

FIG. 5 is a block diagram of an imaging device 500 that includes shading correction coefficients determined by LCS system 200 (FIG. 2). Imaging device 500 includes imaging optics 504, imaging array 112 and image processor 506. Imaging optics 504 includes imaging lens 102 (FIG. 1) and may include other optical elements that project an optical image of object 502 onto imaging array 112. Imaging array 112 has sensing pixels formed on a semiconductor substrate. Each pixel has a photosensitive area, e.g., a photogate or photodiode, to convert received photons into a pixel signal and a non-photosensitive area which has pixel circuit elements to process the pixel signal. The pixel signals from the sensing pixels constitute an electronic image of the received optical image. Imaging array 112 may include CMOS devices.

Image processor 506 is coupled to the sensing pixels to read out the pixel signals and may read out the pixel signals into another circuit for further processing, a display device to display the electronic image, or a memory device to buffer the electronic image. Certain signal processing capabilities may be incorporated in image processor 506. Furthermore, image processor 506 may be integrated with imaging array 112 on the same substrate.

Image processor 506 includes a shading correction processor 508 which uses the shading correction coefficients $P_{POLY}$ and $U_{POLY}$ to perform shading correction. In operation, shading correction processor may multiply polynomials having coefficients of $U_{POLY}$ and $P_{POLY}$ to form estimations of the set of inversion surfaces M. The estimated set of inversion surfaces M provides the shading correction function for the respective color components of an image. Accordingly, for each color component, values of the corresponding estimated inversion surface may be multiplied by the respective pixels of the captured image, in order to apply the shading correction to the captured image.

As described above, the inversion surface matrix is determined by:

$$M = \hat{U} * P'$$

The dimensions of the inversion surface matrix M are typically identical to the dimensions of the image (e.g., number of rows, number of columns). To calculate the inversion surface M, the polynomial-fitted basis and projection vectors $U_{poly}$, $P_{poly}$ may be reconstructed by expanding them out to represent the entire image, as matrices. Because of the sparse nature of the $U_{poly}$ and $P_{poly}$ matrices, the inversion surface M may be determined by a vector by vector multiply and add methodology. According to one embodiment, the values of the $U_{poly}$ and $P_{poly}$ vectors at each image coordinate position may be derived by a scalar multiply and add methodology. In this manner, there is no need to pre-calculate the entire $U_{poly}$ and $P_{poly}$ vectors. According to another embodiment, $U_{poly}$ and $P_{poly}$ coefficients and their locations in the respective sparse matrices may be stored for shading correction processing.

To determine the shading correction coefficients, LSC system 200 (FIG. 2) may be coupled to image processor 506 during a calibration process and used to generate $U_{POLY}$ and $P_{POLY}$, as described above. The shading coefficients stored in storage 218 (FIG. 2) may be provided to shading correction processor 506. After the calibration process, LSC system 200 may be disconnected from image processor 506.

Although the invention has been described in terms of systems and methods for determining shading correction coefficients of an image, it is contemplated that one or more steps and/or components may be implemented in software for use with microprocessors/general purpose computers (not shown). In this embodiment, one or more of the functions of the various components and/or steps described above may be implemented in software that controls a computer. The software may be embodied in tangible computer readable media for execution by the computer.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for determining shading correction coefficients of an imaging device, the method comprising:
   determining an inversion surface based on an image captured by the imaging device;
   approximating the inversion surface using the captured image and eigenvectors associated with singular values of the inversion surface, to form a plurality of reconstruction weights;
   applying a polynomial fit to: i) the plurality of reconstruction weights to determine a first set of polynomial coefficients and ii) the eigenvectors to determine a second set of polynomial coefficients; and
   storing the first and second sets of polynomial coefficients, wherein the first and second sets of polynomial coefficients are used to form the shading correction coefficients.

2. The method according to claim 1, wherein approximating the inversion surface includes approximating the inversion surface using regression analysis.

3. The method according to claim 1, further including, prior to approximating the inversion surface, performing a singular value decomposition (SVD) of the determined inversion surface to determine the eigenvectors.

4. The method according to claim 3, wherein performing the SVD includes reducing the eigenvectors in number,
wherein approximating the inversion surface includes approximating the inversion surface using the reduced number of eigenvectors, and
applying the polynomial fit includes applying the polynomial fit to the reduced number of eigenvectors.

5. The method according to claim 1, wherein:
determining the inversion surface includes determining one or more inversion surfaces, each inversion surface corresponding to a different color associated with the imaging device, and
the approximating the inversion surface and the applying the polynomial fit are repeated for each of the determined one or more inversion surfaces.

6. The method according to claim 1, wherein:
determining the inversion surface includes determining one or more inversion surfaces, each inversion surface corresponding to a different predetermined illuminant, and
the approximating the inversion surface and the applying the polynomial fit are repeated for each of the determined one or more inversion surfaces.

7. The method according to claim 1, wherein the image captured by the imaging device is captured based on a predetermined target image and the step of determining the inversion surface includes:
determining a ratio between the predetermined target image and the captured image to form an initial inversion surface;
filtering the initial inversion surface by a low pass filter; and
normalizing the filtered inversion surface to a peak response of the filtered inversion surface, the normalized inversion surface forming the inversion surface.

8. The method according to claim 7, wherein the target image includes a flat field response associated with an illuminant.

9. A computer-readable medium including a computer program configured to perform the method of claim 1.

10. A shading correction system for an imaging device comprising:
a singular value decomposition (SVD) processor that receives an inversion surface associated with an imaging device and that performs a SVD of the inversion surface to determine eigenvectors of the inversion surface; and
a polynomial fit generator that receives the eigenvectors and a plurality of reconstruction weights approximated from the eigenvectors and applies polynomial fitting to i) the eigenvectors and ii) the plurality of reconstruction weights to determine respective first and second sets of polynomial coefficients.

11. The shading correction system according to claim 10, wherein the SVD processor reduces the eigenvectors in number and the polynomial fit generator applies polynomial fitting to the reduced number of eigenvectors to determine the first set of polynomial coefficients.

12. The shading correction system according to claim 10, further comprising:
a reconstruction weight approximator that receives the eigenvectors and the inversion surface from the SVD processor and approximates the inversion surface using the received eigenvectors and a captured flat field image, the reconstruction weights being formed from the approximated inversion surface,
wherein the reconstruction weight approximator provides the reconstruction weights to the polynomial fit generator.

13. The shading correction system according to claim 10, further comprising a pre-processing system that determines the inversion surface based on a reference flat field associated with an illuminant and a captured flat field image.

14. The shading correction system according to claim 13, the pre-processing system including:
an inversion surface generator that receives the reference flat field and the captured flat field image and generates an initial inversion surface based on a ratio between the reference flat field and the captured flat field image;
a low pass filter that filters the initial inversion surface by a low pass filter; and
an inversion surface normalizer that normalizes the filtered inversion surface by a peak response of the filtered inversion surface, the normalized inversion surface being provided to the SVD processor as the inversion surface.

15. The shading correction system according to claim 10, wherein the inversion surface represents one or more inversion surfaces associated with respective different flat field illuminants, the SVD processor determines one or more sets of eigenvectors associated with each of the respective one or more inversion surfaces, and the polynomial fit generator determines one or more first and second sets of polynomial coefficients corresponding to the respective one or more inversion surfaces.

16. The shading correction system according to claim 10, wherein the inversion surface represents one or more inversion surfaces associated with respective different colors of the imaging device, the SVD processor determines one or more sets of eigenvectors associated with each of the respective one or more inversion surfaces, and the polynomial fit generator determines one or more first and second sets of polynomial coefficients corresponding to the respective one or more inversion surfaces.

17. An imaging device comprising:
an image sensor, including a plurality of pixels, that captures an image; and
an image processor including a shading correction processor that corrects the captured image with shading correction coefficients,
wherein the shading correction coefficients are formed from polynomial-fitted reconstruction weights and polynomial-fitted eigenvectors, the polynomial-fitted eigenvectors corresponding to singular values of an inversion surface associated with the imaging device, and
wherein the polynomial-fitted reconstruction weights represent an approximation of the inversion surface.

18. The imaging device according to claim 17, wherein the inversion surface includes multiple inversion surfaces and the shading correction coefficients include a set of shading correction coefficients for each of the respective multiple inversion surfaces.

19. The imaging device according to claim 18, wherein the multiple inversion surfaces represent respective different multiple illuminants captured by the imaging device.

20. The imaging device according to claim 18, wherein the multiple inversion surfaces represent respective different colors associated with the image sensor.

21. The imaging device according to claim 17, wherein the inversion surface is a function of a flat field image captured by the image sensor and the approximation of the inversion surface is determined by a regression analysis of the inversion surface based on the captured flat field image.

* * * * *